May 14, 1957 S. L. BENDELL ET AL 2,792,523

RASTER WIDTH CONTROL

Filed April 23, 1954

INVENTORS
SIDNEY L. BENDELL & NORMAN P. KELLAWAY

BY [signature]
ATTORNEY

United States Patent Office 2,792,523

Patented May 14, 1957

2,792,523

RASTER WIDTH CONTROL

Sidney Leo Bendell, Camden, and Norman P. Kellaway, Haddon Heights, N. J., assignors to Radio Corporation of America, a corporation of Delaware Application April 23, 1954, Serial No. 425,146

5 Claims. (Cl. 315—27)

This invention relates to television, and more particularly to circuits for deflecting an electron beam to trace a raster in a cathode ray tube.

In television cameras, the video signal is derived from an electron beam that is deflected to trace successive lines forming a raster upon a photo-sensitive surface. In a television receiver, a picture is formed on a fluorescent screen by an electron beam which is deflected to trace successive lines of a raster in synchronism with the deflection of the electron beam at the transmitter. At both the transmitter and receiver, deflection of the electron beam is usually accomplished magnetically by applying sawtooth current waves to the windings of a deflection yoke. The deflection yoke is mounted around the neck of the pickup tube in the camera, or about the neck of a kinescope at the receiver.

The electron beam scans across a line of the raster as the current increases uniformly in the deflection yoke winding and is abruptly snapped back to the beginning of the next line as the sawtooth current wave abruptly changes its value. To vary the size of the scanned raster, it is necessary to vary the amplitude of a deflection wave as it is applied to the windings of the yoke.

In a television receiver, the high voltage for accelerating the electron beam in the cathode ray tube is obtained from high voltage pulses appearing in the horizontal deflection circuit and resulting from the sudden reversal of the magnetic fields during the snap-back time, or retrace interval. Since the high voltage supply is obtained from the horizontal deflection circuit, variations in the loading of the deflection circuit will affect the stabilization of the high voltage as well as the linearity of beam deflection. In color television, it is necessary to maintain the high voltage and focusing circuits at essentially constant levels, and adjustments necessary to increase or decrease the width of the scanned raster may have an adverse effect upon the high voltage and focusing of the reproduced image.

It is an object of this invention to provide an improved raster width control which does not vary the loading of the deflection circuit and therefore does not adversely affect the high voltage and focusing circuits.

In a television studio and transmitting station, it may be desirable to control the size of the scanned raster in a camera from a remote monitoring and control location. It is further desirable to have a control capable of adjusting the size of the scanned raster in a smooth, continuous operation rather than by discrete steps. This sort of a size control could provide an electrical means for creating a "zoom" effect heretofore accomplished by optical means.

The zoom effect is the varying of the televised picture from that of a large area of a subject observed at a distance to that of a relatively small area in close up, and vice versa. This effect may be accomplished by maintaining the optical image at constant size on the photosensitive surface of the television camera tube, and by varying the size of the raster scanned thereon by the electron beam. The video signal thus derived will be equivalent to a video signal obtained from a camera employing optical means for accomplishing zoom.

It is another object of this invention to provide a raster size control for a television camera that is controllable from a remote location.

It is a further object to provide a control of the size of the scanned raster which is smooth, continuous and rapid in its operation.

A further object is to provide an improved means for adjusting the size of a scanned raster which is suitable for use in either a television receiver or a television camera.

According to this invention, the size of the scanned raster is controlled by a pair of saturable reactors. The first saturable reactor has a controllable impedance coil connected in series with a winding of the deflection yoke and the second saturable reactor has a controllable impedance coil that is shunted across a portion of the output transformer. As the impedance of one of the saturable reactor is increased, that of the other saturable reactor is decreased, and the total load on the deflection circuit is maintained constant. It is therefore possible to vary the size of the scanned raster without affecting the linearity of deflection or the high voltage circuit.

Other objects of this invention will become apparent upon a reading of the following specification and an inspection of the accompanying drawing in which.

In the various figures of the drawing similar elements are designated by the same numeral.

Figures 1, 2, 3:
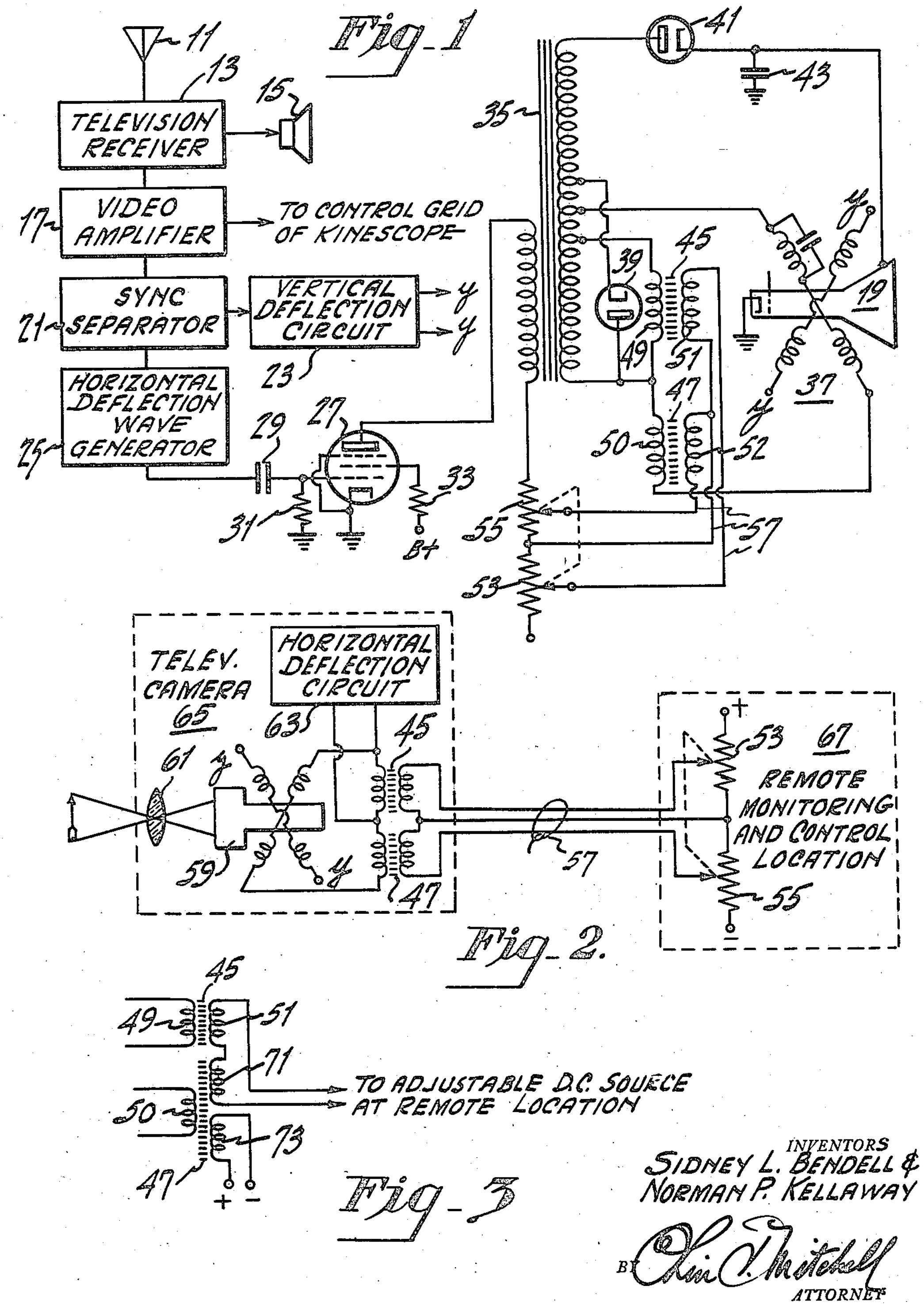
Figure 1 is a circuit diagram, partially in blocks, of a television receiver having a deflection circuit employing this invention.
Figure 2 is a schematic diagram illustrating the manner of controlling the width of a scanned raster in a television camera from a location remote from the camera.
Figure 3 shows an alternative connection for controlling the saturable reactors that are used in this invention.

Referring again but in more detail to Figure 1, there is shown a circuit for receiving television signals. An antenna 11 is coupled to a television receiver circuit 13 which includes a radio frequency section, a converter section, an intermediate frequency amplifier, and a detector. A sound channel is indicated by a speaker symbol 15. A video amplifier 17 derives video signals for the control grid of a kinescope 19. A synchronizing signal separating circuit 21 furnishes synchronizing pulses to both the vertical deflection circuit 23 and the horizontal deflection wave generating circuit 25. The horizontal deflection wave generating circuit 25 furnishes a sawtooth wave of voltage to the control grid of a horizontal output tube 27 through a capacitive coupling 29. A grid leak resistor 31 provides the control grid of the output tube 27 with a proper bias. The screen grid of this tube is coupled to a source of direct energizing voltage by a resistor 33. Sawtooth deflection waves of current are applied to the horizontal output transformer 35 and thence to the horizontal windings of the deflection yoke 37. Transient oscillations, which would appear in the deflection circuit, are damped out by the damper tube 39 which is shunted across a portion of the output transformer 35. High voltage pulses appearing in the output transformer during intervals of retrace are rectified by the high voltage rectifier tube 41 and stored by a capacitor 43 thereby furnishing the kinescope 19 with a high voltage for accelerating the electron beam.

The horizontal windings of the deflection yoke 37 are coupled to the horizontal output transformer 35 together with two saturable reactors 45 and 47. These saturable reactors are essentially of the type described in an article entitled "Magnetic amplifiers" by Siegfried R. Hoh in the May 1953 issue of "Tele-Tech," a periodical of the Caldwell-Clement, Inc. These saturable reactors each have an impedance winding 49 and 50 having a variable impedance characteristic which is determined by the degree of saturation of magnetic core material, and which depends upon the amount of current flow in the respective control windings 51 and 52.

The control windings 51 and 52 of the saturable reactors 45 and 47 are serially connected and are coupled to an adjustable source of direct current by two potentiometers 53 and 55. The movable contacts of the potentiometers 53 and 55 are ganged to operate together. If the potentiometers 53 and 55 are adjusted to an extreme position such that their movable contacts connect with the more positive extremities of their respective resistive elements (the lower extremities as illustrated in Figure 1) then the control winding 51 of saturable reactor 45 will have a maximum current flow and simultaneously the control winding 52 of saturable reactor 47 will have a minimum current flow. Under these conditions, the impedance of the winding 49 of saturable reactor 45 will have a minimum value and likewise the impedance of the winding 50 of saturable reactor 47 will have a maximum value. As the movable contacts of the potentiometers 53 and 55 are moved toward the less positive portions of the elements (upward as illustrated in Figure 1) the current flow will decrease in the control winding 51 of the saturable reactor 45 and therefore the impedance of the winding 49 will increase. Likewise, the current flow in the control winding 52 of the saturable reactor 47 will increase and correspondingly the impedance of the winding 50 will decrease.

The impedance winding 49 of the saturable reactor 45 is shunted across a portion of one of the windings of the output transformer 35 and thereby provides a shunt path for current flow from the transformer 35. The impedance winding 50 of the saturable reactor 47 is connected in series with the horizontal winding of the deflection yoke 37 and both of these serially connected elements are coupled to the output transformer 35. It is thus seen that two paths exist for the flow of current from the secondary winding of the output transformer 35.

Considering the condition of extreme adjustment of the potentiometers 53 and 55 in which the impedance winding 49 of the reactor 45 is at a minimum value and the impedance winding of the reactor 47 is at a maximum, it will be noted that the current flow through the yoke 37 will be at a minimum while the current flow through the impedance winding 49 of the reactor 45 will be at a maximum, and it will be appreciated that the width of the scanned raster in kinescope 19 will be at its minimum. As the potentiometer arms 53 and 55 are adjusted to less positive positions (moved upward as relating to Figure 1), the current flow through the horizontal winding of the yoke 37 will increase and current flow through the impedance winding 49 of reactor 45 will decrease, and the size of the scanned raster will correspondingly increase. If impedance winding 49 is shunted across the proper number of turns of the output transformer, and/or if a suitable impedance is serially connected with the impedance winding 49 of saturable reactor 45, the net effect of the increase in current through the path including the yoke winding will be properly compensated for by the effect of the decrease in current through the path comprising the impedance winding 49 of saturable reactor 45. The total loading upon the output transformer 35 will remain essentially constant regardless of the varying adjustments of the potentiometers 53 and 55 which accomplish control of the raster width. Since the deflection loading of the output transformer 35 remains at essentially a constant value, the high voltage rectifier 41 will not be affected by adjustments of the width control.

The length of the control leads 57 is not critical since the A. C. elements are connected directly to the winding of the deflection yoke 37. Thus, in a television receiver or monitor, the raster width may be controlled from a conveniently placed knob without regard to the location of the other components of the deflection circuit. Since the length of the control leads is of little importance, this invention may be applied to control of deflection circuits in a television camera where it may be desired to locate the controls at a remote point.

Figure 2 illustrates the manner in which the horizontal deflection circuit of a television camera 65 may be controlled from a monitoring location 67 remote from the camera position. The circuit of Figure 2 shows a camera pickup tube 59 upon which an image is focused by an optical system 61. The deflection yoke 37 includes a horizontal deflection winding coupled to the horizontal deflection circuit 63. A pair of saturable reactors 45 and 47 couple the horizontal winding of the deflection yoke 37 to the horizontal deflection circuit in a manner similar to that described with reference to the circuit of Figure 1. The control leads 57 for the saturable reactors 45 and 47 may be extended from the television camera 65 through a cable connection, as indicated, to a remote monitoring and control location 67. At this location, these control leads are coupled to an adjustable direct current source such as indicated by the potentiometers 53 and 55 which are ganged to operate together as illustrated. By adjusting the movable contacts of these potentiometers 53 and 55, the amplitudes of the deflection waves applied to the horizontal winding of the camera deflection yoke 37 may be adjusted. Thus, control of the width of the scanned raster may be accomplished from a remote point by a means which does not affect the loading of the deflection circuit.

Control of the raster size by the use of saturable reactors as illustrated, may be smooth and rapid, and when applied to the control of a television camera deflection system, the effect of zooming the scanned picture without any optical adjustments will be possible merely by decreasing the size of the scanned raster. A relatively small portion of the optical image will be traced by the electron beam and the video signal thereby obtained will be similar to a signal which could have been obtained by changing the optical adjustment and bringing the picture into closeup. The variation from a large area picture to a small area, closeup picture (and vice versa) may be thus accomplished rapidly and smoothly.

In Figure 2, a total of three control leads are used for control of the two individual saturable reactors located in the television camera circuit. While this makes possibile the control of each reactor individually from the remote location, it may be desirable in some instances to minimize the number of control leads and to control the reactors collectively from the control point. Figure 3 illustrates an alternate connection for controlling the saturable reactors 45 and 47. In this circuit, one of the saturable reactors 47 is provided with two control windings 71 and 73. One of these control windings 73 is connected to a constant source of direct current. This saturable reactor 47 is normally in a state of saturation because of the flow of direct current in its control winding 73. If current is caused to flow through the control windings 51 and 71 from the adjustable direct current source at the remote location, the saturable reactor 45 will become saturated, but the saturable reactor 47 will become de-saturated, since the magnetizing effect of the current in winding 71 is in opposition to the magnetizing effect of the constant direct current in winding 73.

Therefore, if no current flows from the direct current source at the remote location, saturable reactor 45 will be unsaturated and the impedance of its winding 49 will be relatively high. Simultaneously, saturable reactor 47 will be saturated and the impedance of its winding 50 will be at a low value. As the current from the remote source increases, the impedance of the winding 49 decreases while the impedance of the winding 50 increases. The manner of operation of the saturable reactors connected as shown in Figure 3, has been disclosed in a patent application of Bernard V. Vonderschmitt, filed April 30, 1954, Serial No 352,247.

Having thus described the invention, what is claimed is:

1. In a television deflection system having a means for generating deflection waves and a deflection yoke winding, a circuit for controlling the size of a scanned raster, said circuit comprising a first saturable reactor coupled serially between said deflection yoke winding and said deflection wave generating means, and a second saturable reactor coupled in shunt across at least a portion of said deflection wave generating means.

2. A circuit arrangement for varying a dimension of a raster produced on a cathode ray tube of a television receiver including means for generating a deflection wave, a deflection winding, a saturable reactor connected in series with said deflection winding across said generating means, another saturable reactor connected in shunt with said generating means, said saturable reactors having control windings, and means to apply direct energizing potentials to said control windings in differential relationship.

3. A television deflection system for deflecting an electron beam to scan a raster in a cathode ray tube, said system comprising in combination, a means for generating deflection waves, a deflection yoke winding coupled to said wave generating means, a first saturable reactor having an impedance winding and a control winding, the impedance winding of said first saturable reactor being connected in series between said deflection yoke winding and said deflection wave generating means, a second saturable reactor likewise having an impedance winding and a control winding the impedance winding of said second saturable reactor being connected in shunt across at least a portion of said deflection wave generating means, the control winding of said first saturable reactor being connected to a first source of direct current, the control winding of said second saturable reactor being connected to a second source of direct current, both of said sources of direct current potential being adjustable, the current from said second direct current source varying inversely in magnitude to the current from said first direct current source.

4. A deflection circuit for a television receiver, including a deflection winding, means for generating a deflection wave, a saturable reactor having a variable impedance winding connected in series with said deflection winding and said generating means and having a control winding, another saturable reactor having a variable impedance winding shunting at least part of said generating means and having a control winding, said control windings being connected together and poled to have opposing effects on the impedance winding in response to direct current flowing through said control windings.

5. A system for deflecting an electron beam to scan a raster in a cathode ray tube, said system comprising a deflection wave generator having an output circuit, a plurality of load circuits coupled to the output circuit of said deflection wave generator, a first of said load circuits comprising a deflection yoke winding serially connected to an impedance winding of a first saturable reactor, a second of said load circuits comprising an impedance winding of a second saturable reactor, each of said saturable reactors having an control winding, the control windings of said first saturable reactor and said second saturable reactor being serially connected and being connected to a plurality of conductors, said conductors connecting with a first source of direct current voltage and a second source of direct current voltage, said first and second source of direct current voltage being mutually controllable, said second source of direct current voltage having an inverse relation with said first source of direct current voltage.

References Cited in the file of this patent

UNITED STATES PATENTS

| | | |
|---|---|---|
| 2,438,359 | Clapp | Mar. 23, 1948 |
| 2,534,557 | Ostreicher | Dec. 19, 1950 |
| 2,574,245 | Court | Nov. 6, 1951 |